(12) United States Patent
Zhou et al.

(10) Patent No.: US 10,192,289 B2
(45) Date of Patent: Jan. 29, 2019

(54) SYSTEM, METHOD, AND APPARATUS FOR DATA PROCESSING AND DISPLAY

(71) Applicant: ALIBABA GROUP HOLDING LIMITED, George Town, Grand Cayman (KY)

(72) Inventors: Ningyi Zhou, Hangzhou (CN); Xiao Wen, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/729,611

(22) Filed: Oct. 10, 2017

(65) Prior Publication Data

US 2018/0096459 A1   Apr. 5, 2018

Related U.S. Application Data

(63) Continuation of application No. 15/170,708, filed on Jun. 1, 2016, now Pat. No. 9,786,037.

(30) Foreign Application Priority Data

Jun. 3, 2015 (CN) .......................... 2015 1 0300977

(51) Int. Cl.
*G06T 3/40* (2006.01)
(52) U.S. Cl.
CPC ................. *G06T 3/4092* (2013.01)
(58) Field of Classification Search
None
See application file for complete search history.

(56) References Cited

U.S. PATENT DOCUMENTS

| 5,379,044 A | 1/1995 | Carlson et al. |
| 2004/0073873 A1 | 4/2004 | Croney et al. |
| 2006/0074553 A1 | 4/2006 | Foo et al. |
| 2012/0052870 A1 | 3/2012 | Habicher |
| 2012/0182145 A1 | 7/2012 | Jameson et al. |
| 2012/0323992 A1 | 12/2012 | Brobst et al. |
| 2014/0278067 A1 | 9/2014 | Gordon et al. |

FOREIGN PATENT DOCUMENTS

| CN | 101876750 A | 11/2010 |
| CN | 101908060 A | 12/2010 |
| CN | 102473352 A | 5/2012 |

(Continued)

OTHER PUBLICATIONS

PCT International Search Report and Written Opinion dated Aug. 29, 2016, issued in corresponding International Application No. PCT/US16/35323 (10 pages).

(Continued)

*Primary Examiner* — Michelle Chin
(74) *Attorney, Agent, or Firm* — Finnegan, Henderson, Farabow, Garrett & Dunner LLP

(57) ABSTRACT

A method for data processing and display is disclosed. The method may be implemented by a terminal device. The method may include: transmitting a data request to a server, the data request including at least data associated with a display area of a window; receiving trace data from the server according to the data request, the trace data including dynamic motion data of a target object within the display area; and processing the received trace data to render a trace image in the display area.

24 Claims, 11 Drawing Sheets

(56) References Cited

FOREIGN PATENT DOCUMENTS

CN 102834309 A 12/2012
WO WO 01/59706 A1 8/2001

OTHER PUBLICATIONS

Extended European Search Report pursuant to Rule 62 EPC, the Supplementary European Search Report (Art. 153(7) EPC) and the European Search Opinion dated May 2, 2018 (8 pgs.).
First Chinese Search Report issued by the State Intellectual Property Office of the People's Republic of China in counterpart Chinese Application No. 201510300977.X dated Oct. 24, 2018 (1 page).
First Chinese Office Action issued by the State Intellectual Property Office of the People's Republic of China in counterpart Chinese Application No. 201510300977.X dated Nov. 5, 2018 (12 pages).

1200

SYSTEM, METHOD, AND APPARATUS FOR DATA PROCESSING AND DISPLAY

CROSS REFERENCE TO RELATED APPLICATION

The present application is a continuation of U.S. application Ser. No. 15/170,708, filed Jun. 1, 2016, which is based on and claims the benefits of priority to Chinese Application No. 201510300977.X, filed Jun. 3, 2015, both of which are incorporated herein by reference in their entireties.

TECHNICAL FIELD

The present application relates to methods, apparatus, and systems for data processing and display.

BACKGROUND

By sampling location, time, speed, and other information of one or more moving objects, trace data of the moving objects can be formed based on a chronological order of the sampled information, which includes, for example, traffic trace data, animal migration data, climate or airflow data, personnel movement data. Using traffic trace data as an example, by utilizing a certain positioning technology, such as video surveillance and image identification, WiFi positioning technology, RFID tag technology, or GPS technology, trace data for movements of vehicles and pedestrians may be obtained. There is a great demand on analyses and visualization of trace data for smart city, traffic management, crowd geographic profiling, and other services based on location (Location Based Service, LBS).

In certain technologies, for visualizing trace data, a server can be used to render a heat map based on the trace data and zoom-level, and then load tiles of the heat map (e.g., visualization processes of a heat map in Baidu map and visualization of Twitter data in Mapbox). However, because servers for those technologies have rendered a heat map based on a large amount of data, a terminal device downloads and assembles the heat map according to the size ratio of the heat map from the servers instead of accessing real-time data. Thus, image quality of the heat map can be poor due to a large amount of data transmitted through the Internet.

In certain technologies, for visualizing trace data, still images can be formed directly from the trace data (e.g., analysis and processes for geographical data in Geographic Information System, GIS). However, time needed to render images increases with the amount of data. Although these technologies provide quality images, they do not allow users to analyze the content and data of the still images independently and interactively.

In certain technologies, trace data can be directly visualized (e.g., analyzes of taxi in New York Times). Such methods are often used for news, customized based on needs, and data are prepared by data engineer, where the data are prepared into a small-size format and volume, and do not provide a high-level quality.

For technologies that provide to terminal devices trace images downloaded from backend servers, the trace images formed by backend servers suffers from delays, which cause the terminal devices not able to display the trace images in real time. There are still no good solutions for such issues.

SUMMARY

According to various embodiments of the disclosure, methods, apparatus, and system for data visualization are provided to resolve issues relating to delays of trace images that are formed by backend servers, where the delay causes terminal devices not able to display the trace images real time.

One aspect of the present disclosure is directed to a method for data processing and display. The method may be implemented by a terminal device. The method may comprise: transmitting a data request to a server, the data request including at least data associated with a display area of a window; receiving trace data from the server according to the data request, the trace data including dynamic motion data of a target object within the display area; and processing the received trace data to render a trace image in the display area.

Another aspect of the present disclosure is directed to a non-transitory computer-readable storage medium that stores a set of instructions that is executable by at least one processor of a terminal device to cause the terminal device to perform a method for processing data. The method may comprise: transmitting a data request to a server, the data request including at least data associated with a display area of a window; receiving trace data from the server according to the data request, the trace data including dynamic motion data of a target object within the display area; and processing the received trace data to render a trace image in the display area.

Another aspect of the present disclosure is directed to a system for data processing. The system may comprise a server configured to provide trace data of a target object, and a terminal device. The terminal device may comprise a memory that stores a set of instructions, and a hardware processor configured to: transmit a data request to the server, the data request including at least data associated with a display area of a window; receive the trace data from the server according to the data request, the trace data including dynamic motion data of a target object within the display area; and process the received trace data to render a trace image in the display area.

Another aspect of the present disclosure is directed to an apparatus for data processing and display. The apparatus may comprise: a sending module configured to transmit a data request to a server, the data request including at least data associated with a display area of a window; a receiving module configured to receive trace data from the server according to the data request, the trace data including dynamic motion data of a target object within the display area; and a processing module configured to process the received trace data to render a trace image in the display area.

Another aspect of the present disclosure is directed to a method for data processing. The method may be implemented by a terminal device. The method may comprise transmitting a data request to a server, the data request including at least data associated with a display area of a window; receiving trace data from the server according to the data request, the trace data including dynamic motion data of a target object within the display area; processing the received trace data to determine a rendering density of a trace image to be rendered based on the received trace data in the display area; selecting, based on the rendering density, a dot pattern rendering mode or a line pattern rendering mode for rendering the trace image; and rendering the trace image based on the selected pattern rendering mode.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

According to a first aspect of the disclosure, a method for processing data visualization is provided. The following figures indicate steps conducted in a certain sequence, but sequences to conduct the steps are not so limited.

Figure 1:
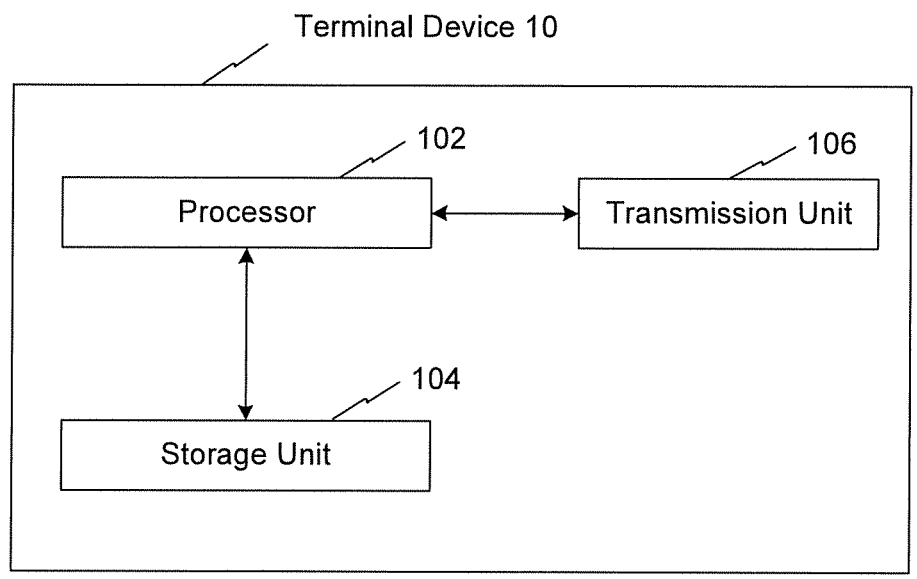
FIG. 1 is a block diagram illustrating an apparatus for data processing and display, according to an exemplary embodiment.

According to the first aspect of the disclosure, a method for processing data visualization is conducted on a mobile terminal, a computer terminal, or a similar device. Using a method conducted on a terminal device for example, FIG. 1 shows an example of a block diagram of a terminal device on which a method for data visualization is conducted. As illustrated in FIG. 1, a terminal device 10 may include one or more processor 102 (the processor includes but not limited to microcontroller units (MCUs) or field programmable gate arrays (FPGAs), a storage unit, e.g., memory, 104 for storing data, and a transmission unit, e.g., a networking circuit or device, 106 for communication. A person of ordinary skill in the art would have understood that FIG. 1 is an example and does not limit the scope of embodiment. For example, terminal device 10 may include more or less components than those illustrated in FIG. 1 or may have different configuration.

Storage unit 104 may store software programs or modules, such as programs or modules implementing a method for processing data visualization. Processor 102 may, by executing programs or modules stored in storage unit 104, conduct data processing, fault detection, and various applications. Storage unit 104 may include a high-speed random access memory, a non-volatile storage device, one or more magnetic storage device, a flash memory, or other non-volatile solid state storage device. In some embodiments, storage unit 104 may further include a remote storage device which connects to terminal device 10 through a network, including but not limited to: the Internet, an intranet, local area network, a mobile communication network, a wireless network, or a combination thereof.

Transmission unit 106 may receive or transmit data through a network. In some embodiments, transmission unit 106 includes a network interface controller (NIC), which communicates with the Internet through a base station and network equipment. In some embodiments, transmission unit 106 is a radio frequency (RF) module, which communicates with the Internet wirelessly. Further, terminal device 10 can include a display terminal.

Figure 2A:
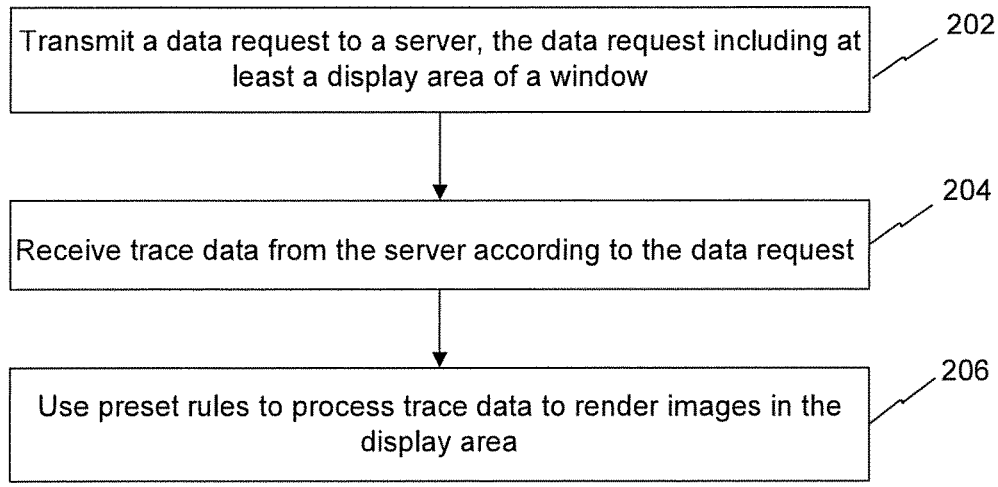
FIG. 2A is a flow diagram illustrating a method for data processing and display, according to an exemplary embodiment.

FIG. 2A is an exemplary flow diagram of a data processing method 200a in the operating environment described in the first embodiment. Referring to FIGS. 1 and 2, the data processing method may include the following steps. Method 200a may be implemented by a terminal device shown in FIG. 1.

Step S202 may include transmitting a data request to a server. The data request may include at least a display area of a window, which is a carrier for displaying data visualization. The window can be an area of a display terminal, which can be a monitor at a client, where the client can be terminal device 10 illustrated in FIG. 1. The display area may correspond to a realistic geographic area. By operating a region within the window, such as demagnifying, magnifying, or rotating the region, a corresponding display area can be obtained. To reduce the amount of data transmitted, characterization data of the display area can be included in the data request for data delineated by the display area. Subsequently, the server selects from stored data and returns the data corresponds to the data request.

For example, when traffic information in City A is shown in a dynamic display image in a window, a display area can be defined to correspond to a critical traffic region of City A (such as Region B of City A) by demagnifying, magnifying, and/or rotating the dynamic display image in the window, where the display area precisely shows certain parts, e.g. No. 1 Street and No. 1 Road of Region B of City A, that need close monitoring. To show traffic information in the display area of the dynamic display image, data of the traffic information in the display area may need to be obtained. After determining the display area, characterization data of display area can be generated and included in a data request. The data request may be transmitted to a server for requesting the server to provide the traffic information of the display area. If a data request does not include characterization data of a display area, a server may provide all traffic information of City A to a terminal device, which reduces efficiency of data transmission. This may also affect the display of the traffic information, because the terminal device may have limited capability to extract useful data from the received traffic information.

Step S204 may include receiving trace data from the server according to the data request, where the trace data is dynamic motion data of a target object within the display area. In Step S204, during a continuous motion of the target object, a number of data points of the target object may be sampled to generate the dynamic motion data. The dynamic motion data may include at least location information and identification information of the target object. Based on the display area of the data request, the server searches in a database for the dynamic motion data of the target object within the display area.

When a server renders dynamic motion data to generate an image, other information may be added, which increases the amount of total data. If a display area is modified, the server may be required to process and render the dynamic motion data again. In various embodiments of the present disclosure, a server may not need to render the dynamic motion data again to generate an image. Instead, the server may return the dynamic motion data.

The trace data may be a combination of sampling points. The dynamic motion data stored in a database may be collected and compiled from sampling points yielded from various sampling methods. The various sampling methods may or may not have the same data format. Each of the various sampling methods may include location information, time information, and identity information. The location information can be a coordinate value in the Cartesian coordinate system of a target object. In the two-dimensional Cartesian coordinate system, the location information can by x, y values. In the three-dimensional Cartesian coordinate system, the location information can be x, y, z values. The location information can also be latitude and longitude values of the target object.

In one embodiment, for example, when the location information is latitude and longitude values of the target object, time information can be the time when the location information of the target object is sampled. Identity information, for distinguishing target objects of the location information and time information, can be the only identity assigned to the target object. In some embodiments, the identity information can also be inherent characteristics of a target object. For example, the identify information can be the plate number of a vehicle, mobile number of a person, identity number of a mobile terminal device (e.g., MAC address), or a certain account number of a mobile terminal device (AppID). Further, when the methods of sampling are different, content of the raw data may also be different. For example, in visualizing traffic information, sampled data may include types and appearances of vehicle. Further, some information, such as speed and acceleration of a vehicle, may be derived from the above information.

When, for example, traffic information in City A is shown in a dynamic display image and a display area is determined to correspond to Region B of City A, a server may return trace data, which is the data stored in the server, relating to vehicle movements in Region B. For example, the trace data can be motor vehicles and non-motor vehicles on the No. 1 Street and No. 1 Road of Region B.

Step S206 may include selecting and using preset rules for rendering images to process trace data, where the rules may include selecting a method of rendering images (a first rule) and/or deleting redundant trace data (a second rule). Further, in step S206, the trace data may include a plurality of sampled data for a plurality of target objects. Additionally, when rendering the trace data, trace data may be processed using each sampled point as a unit. After receiving the trace data, a terminal device may determine or select in advance a rendering rule from rendering rules stored in the terminal device.

In one embodiment, a first rendering rule may be selecting a rendering method, where the rendering method is a direct manifestation of a trace dynamic image. Different rendering methods may lead to different costs in rendering and different rendering effects. A second rendering rule may be removing redundant trace data to reduce the number of data for rendering an image for improving efficiency. If the trace data are not processed and images are rendered using unprocessed trace data, a terminal device can be burdened with heavy duty of data processing, and the rendered trace image may not be the best visualization.

For example, when a server provides trace data of each of motor vehicles and non-motor vehicles traveling in the No. 1 Street and No. 1 Road of Region B of City A, a terminal device selects preset first rendering rule and second rendering rule. Based on the first rendering rule, a rendering method for vehicle moving data can be selected. Based on the second rendering rule, redundant trace data can be deleted. Accordingly, trace data of each of the motor and non-motor vehicles traveling in the No. 1 Street and No. 1 Road of Region B of City A are rendered and displayed in a window. If no rendering rule is selected, the terminal device faces a large amount of data provided by the server, and may not promptly render an image based on the data correspond to the display area. Therefore, cost for rendering images increases.

According to Steps from S202 to S206, a terminal device, instead of a server, can conduct operations of trace data processing and trace image rendering for realizing the visualization of trace data. The terminal device can be a mobile terminal, a computer terminal, or similar computing devices. By transmitting data request, a terminal device can receive trace data and render an image in a window for dynamic display. In circumstances when display region changes quickly, the disclosed methods can smoothly switch trace data, and maintain stability and aesthetics.

Accordingly, a terminal device may transmit data request for data included in display area in a window, and may receive trace data provided by the server based on the data request including dynamic motion data of target objects in the display area. Additionally, by selecting preset rendering rules, the terminal device may process received trace data and render a trace image. In one embodiment, the terminal device may receive trace data, instead of rendered trace image information, from the server, such that the trace image displayed at the terminal device is rendered based on the received trace data in real time. The disclosed method can resolve the issues occurred when a terminal device receives trace image from a backend server, and issues relating to not being able to timely display trace image at the terminal device, as the trace image rendered by the backend server often has delays.

According to some embodiments, the data request in Step S202 can be implemented in one or more of the following ways.

First: sending a real-time data request. When a window displays a dynamic image, a terminal device may send a real-time data request to a server, which collects and processes dynamic motion data sampled from target objects and provides trace data to the terminal device.

For example, for displaying traffic information of Region B of City A in a display area corresponding to Region B, a terminal device may transmit a real-time data request to a server to obtain traffic information of Region B and to display real-time traffic information.

Second: transmitting data requests according to a preset time interval. When searching for past dynamic motion data, a terminal device may divide the time period, to be searched, into a number of preset intervals, and may request data of each preset interval. This method can reduce the amount of data that a server sends to a terminal device and can avoid network congestion. In some circumstances, because a terminal device may not predict the amount of data belonging to a certain preset time interval, the distribution of data in each preset time interval may possibly be uneven, which may cause the network to be unstable.

For example, for displaying traffic information of Region B of City A in a display area corresponding to Region B during a holiday, a terminal device may divide the time of the holiday into 10,000 time intervals, transmits a request every 1 ms to a server for requesting dynamic motion data of target objects in Region B during the holiday, and renders a real-time image according to the received data from the server.

Third: after receiving trace data according to a first data request, sending a second data request. In some embodiments, multiple data requests may be needed. When a terminal device receives a trace data according to an initial data request, the terminal device may transmit another data request. The data requests may be transmitted at unfixed intervals or speed, resolving the network congestion issue that may occur when data requests are transmitted at constant intervals.

For example, for displaying traffic information of a certain time period of Region B of City A in a display area corresponding to Region B, a terminal device may divide the time period into a number of time intervals. After receiving data corresponding to an initial time interval according to an initial data request, a terminal device may transmit another data request. For instance, after transmitting a data request for Time Interval C, a terminal device may have to wait for dynamic motion data of a target object corresponding to Time Interval C to be provided by a server. The terminal device may wait for the server to provide the data corresponding to Time Interval C before transmitting a data request for Time Interval D.

The rendering method in Step S206 may include a dot pattern rendering mode and a line pattern rendering mode.

Sampled points can be used as units to render trace images. Dot pattern rendering mode can mark, for example, a first sampled point and a second sampled point, instead of drawing a line between the first sampled point and the second sampled point. Line pattern rendering mode can, for example, mark a first sampled point and a second sampled point, and then to add a line connecting the first sampled point and the second sampled point.

In one embodiment, when the first sampled point and the second sampled point are close to each other and appear to be visually connected, dot pattern rendering mode may be chosen. When the first sampled point and the second sampled point are not close to each other and appear to be visually disconnected, line pattern rendering mode may be chosen.

Figure 2B:
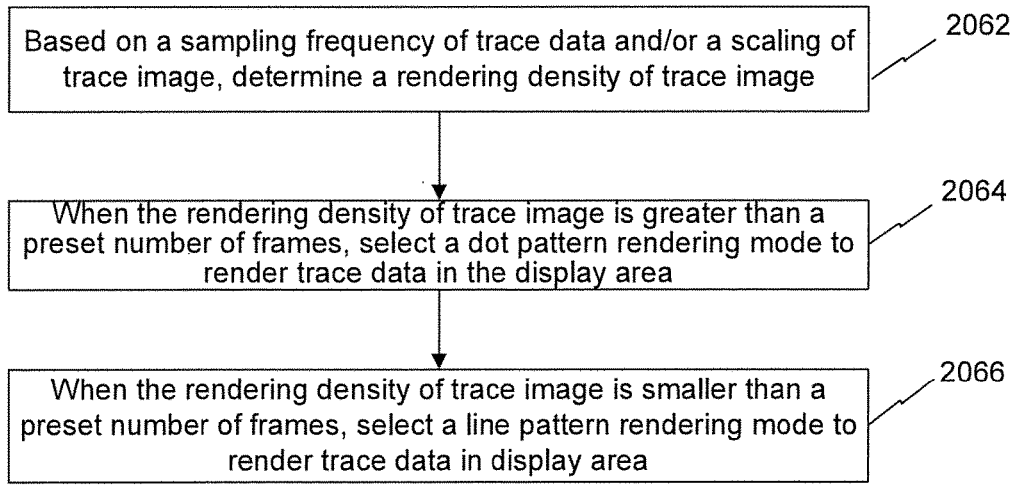
FIG. 2B is a flow diagram illustrating another method for data processing and display, according to an exemplary embodiment.

FIG. 2B is a flow diagram illustrating a method 200*b* for data processing and display, according to an exemplary embodiment. In some embodiments, Step S206 may further include method 200*b*, which may include:

Step S2062: based on a sampling frequency of trace data and/or a scaling of trace image, determining a rendering density of trace image. In Step S2062, dynamic motion data can be obtained by sampling at a single sampling frequency. When display area is large, the amount of dynamic motion data of target objects may also be large. The rendering density of trace images, the sampling frequency of trace data, and the scaling of trace images are related. In some cases, the rendering density of trace image may be determined based on a number of frames rendered within a preset time interval. For example, the rendering density can be measured by a number of frames rendered within one second (1 s).

The embodiments can provide various rendering modes for different purposes and considerations. When considering cost of rendering images, a dot pattern mode for rendering images can be employed. When considering rendering density, a line pattern rendering mode for rendering images can be employed. When considering visualization and presentation of data, the embodiments of the present disclosure can provide flexibility in selecting rendering modes, where rendering density of a trace image is determined, and, based on the rendering density, a rendering mode is selected.

If only the cost of rendering images is considered and a dot pattern mode is selected, distance of two dots may be large, making the rendered trace image appear to be discontinuous. If the rendering density is increased, the amount of data and cost of rendering at the front end browser may also increase. When rendering density of trace image reach a reasonable level, a dot pattern rendering mode may achieve proper visualization of data. When rendering density is low, a dot pattern mode may not achieve visual continuity of trace data, and, thus, a line pattern mode can be selected. When selecting the first rendering rule to process trace data, one of dot pattern rendering mode and line pattern rendering mode can be selected. Additionally, when rendering an image, a dot pattern rendering mode and a line pattern rendering mode can be flexibly selected based on the actual situation.

Determining rendering density based on the sampling frequency of trace data and/or the scaling of trace image may include the following steps.

Step S2064: when the rendering density of trace image is greater than a preset number of frames, selecting a dot pattern rendering mode to render trace data in the display area. In this step, a preset number of frames can be used to determine whether rendering density is within a reasonable range, and can be used to determine rendering methods. When the rendering density of trace image is greater than the preset number of frames, it may indicate that displacement among frames may not be recognizable because of human eyes' visual persistence, focusing capability, and a blurry effect of rendering of each point. In this situation, the trace image may appear to a user as a continuous animation, and lines may not be needed to ensure continuity among dots. Thus, the dot pattern rendering mode can be selected.

Step S2066 may include: when the rendering density of trace image is smaller than a preset number of frames, selecting a line pattern rendering mode to render trace data in display area. In this step, a preset rendering density may be used to determine whether the rendering density is within a reasonable range, and to determine rendering methods. In this situation, the trace image may not appear to be continuous to a user. In this step, a line can be added between two dots to compensate the visual discontinuity due to large spacing between the dots. As such, an improved trace image can be visualized and presented to a user, and trace data can be realistically provided.

According to Steps S2062 to S2066, a rendering density can be obtained, and, due to the flexibility of selecting rendering methods, cost of rendering can be reduced and various effects of rendering are satisfied. The embodiment of the present disclosure can provide flexibility in adjusting rendering methods or modes based on sampling frequency of trace data and map scaling, and can provide a balanced approach between visualization and efficiency of front-end rendering.

For example, whether the pixels corresponding to trace data rendered on a screen at a current sampling frequency exceeds a preset pixel distance can be determined, e.g., by using 1 pixel as a threshold. If the pixel distance is smaller than 1 pixel, dot pattern rendering mode can be selected. Otherwise, line pattern rendering mode can be selected. For example, for rendering a map, when obtaining two pixels of a trace image data, these two pixels can be projected to the monitor by using a map projection transformation, e.g., web Mercator projection. Further, whether these pixels when projected on the screen are smaller than a single pixel can be determined. If these pixels when projected on the screen are greater than a single pixel, then pixel density sampled at this frequency may exceed a preset number of frames. Thus, dot pattern rendering mode can be selected.

Figure 2C:
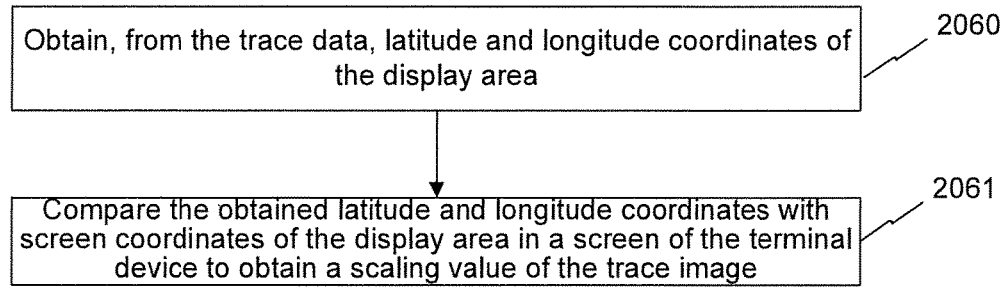
FIG. 2C is a flow diagram illustrating another method for data processing and display, according to an exemplary embodiment.

FIG. 2C is a flow diagram illustrating a method 200c for data processing and display, according to an exemplary embodiment. In some embodiments, prior to Step S2062 of determining a rendering density of trace image, based on a sampling frequency of trace data and/or a scaling of trace image, Step 206 may further include method 200c, which may include the following steps:

Step S2060: obtaining, from the trace data, latitude and longitude coordinates of the display area.

Step S2061: comparing the obtained latitude and longitude coordinates with screen coordinates of the display area in a screen of the terminal device to obtain a scaling value of the trace image.

In Steps S2060 and S2061, since the trace data returned by the server to the terminal device include latitude and longitude coordinates, to displayer the trace image in a display of the terminal device, a scaling value of the trace image can be determined. The scaling value can be determined by a ratio of latitude and longitude coordinates of any two points in the display area to coordinates of the two points in a display screen of the terminal device. In one embodiment, the request transmitted by the terminal device to the server may include the display area. For example, if the display area is rectangular, the display area can be determined by two end points of its diagonal. In a screen coordinate system, the end points can be represented by [xMin, yMin] and [xMax, yMax]. In a latitude and longitude coordinate system, the end points can be represented by [NMin, EMin], [NMax, EMax]. Thus, the scaling value of the trace image can be determined by a ratio of the diagonal lengths in the two coordinate systems.

According to steps S2060 and S2061, the scaling value of the trace image can be determined by obtaining latitude and longitude coordinates from trace image data returned by the server, and calculating a corresponding relation between the display area in a latitude-longitude coordinate and a screen coordinate of a terminal device. Thus, the trace image can be accurately displayed.

Figure 2D:
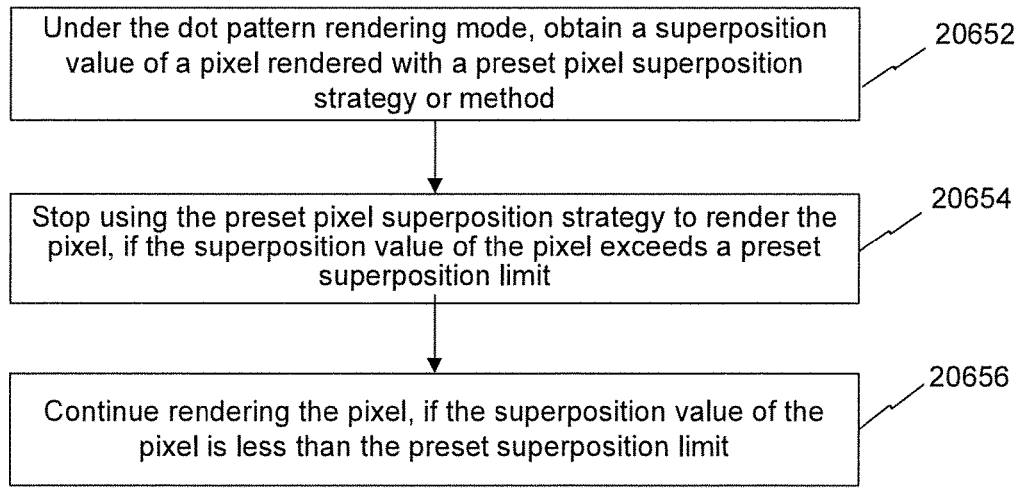
FIG. 2D is a flow diagram illustrating another method for data processing and display, according to an exemplary embodiment.

FIG. 2D is a flow diagram illustrating a method 200d for data processing and display, according to an exemplary embodiment. In some exemplary embodiments under a dot pattern rendering mode, after step S2064, method 200b may further include method 200d, which may include the following steps:

Step 20652: under the dot pattern rendering mode, obtaining a superposition value of a pixel rendered with a preset pixel superposition strategy or method.

In Step 20652, since a pixel may correspond to a plurality of sampling points, some of the sampling points may superimpose. To differentiate superimposing sampling points, when rendering the trace image, corresponding display situations for such pixels can be determined according to a preset pixel superposition strategy. A superposition value of the pixel can be obtained.

In some embodiments, the preset pixel superposition strategy may only need to differentiate display statuses of pixels. For example, the pixel superposition strategy can be preset to be a negative correlation between a number of superimposed sampling points of a pixel and a displayed transparency of the pixel, i.e., the more sampling point superimposed on a pixel, the lower transparent value of the displayed pixel becomes. For another example, the pixel superposition strategy can be preset to relate a number of superimposed sampling points of a pixel to a displayed brightness of the pixel, e.g., the more sampling points superimposed on a pixel, the brighter the pixel is displayed. This can be achieved by setting a blending mode of a rendering environment. In one example of rendering images with html5's canvas, an rendering environment of the canvas, a global composite operation, can be set to 'lighter,' under which the displayed pixel can become brighter with more superimposing sampling points.

Step S20654: stopping using the preset pixel superposition strategy to render the pixel, if the superposition value of the pixel exceeds a preset superposition limit.

In Step S20654, when the superposition value of a pixel exceeds a preset superposition limit, it may be unimportant to render the pixel in the display area and may not affect the display effect. To avoid unnecessary overlapping of rendered images, the pixel may not be rendered in the display area.

For example, when the pixel superposition strategy is preset to be a negative correlation between a number of superimposed sampling points of a pixel and a displayed transparency of the pixel, and when the transparency value reaches a threshold, e.g., 95%, human eyes may no longer differentiate the pixel, and whether to display the pixel becomes unimportant to rendering the image. Thus, the process of rendering the pixel can be prevented. For another example, when the pixel superposition strategy is preset to relate a number of superimposed sampling points of a pixel to a displayed brightness of the pixel, and when the brightness reaches a threshold, e.g., 95%, human eyes may no longer differentiate the pixel, and whether to display the pixel becomes unimportant to rendering the image. Thus, the process of rendering the pixel can be prevented.

Step S20656: continuing rendering the pixel, if the superposition value of the pixel is less than the preset superposition limit.

In Step S20656, when the superposition value of the pixel is less than the preset superposition limit, and to differentiate the sampling points of the pixel, it may still be useful to display the pixel corresponding to the sample points with different display effects.

For example, when the pixel superposition strategy is preset to be a negative correlation between a number of superimposed sampling points of a pixel and a displayed transparency of the pixel, and when the transparency value does not reach a threshold, the process of rendering the pixel with the preset pixel superposition strategy can be continued. For another example, when the pixel superposition strategy is preset to relate a number of superimposed sampling points of a pixel to a displayed brightness of the pixel, and when the brightness does not reach a threshold, the process of rendering the pixel with the preset pixel superposition strategy can be continued.

By steps from S20652 to S20656, the pixel superposition strategy can be used. Based on a different number of superimposed sampling points on pixels of the rendered trace image, different display effects can be used on the pixels. By obtained the superposition value and comparing it with the preset superposition limit, whether continuing rendering the pixel with the preset pixel superposition strategy can be determined, avoiding unnecessary overlapping rendered images and reducing amount of data for processing at a terminal device end.

Figure 2E:
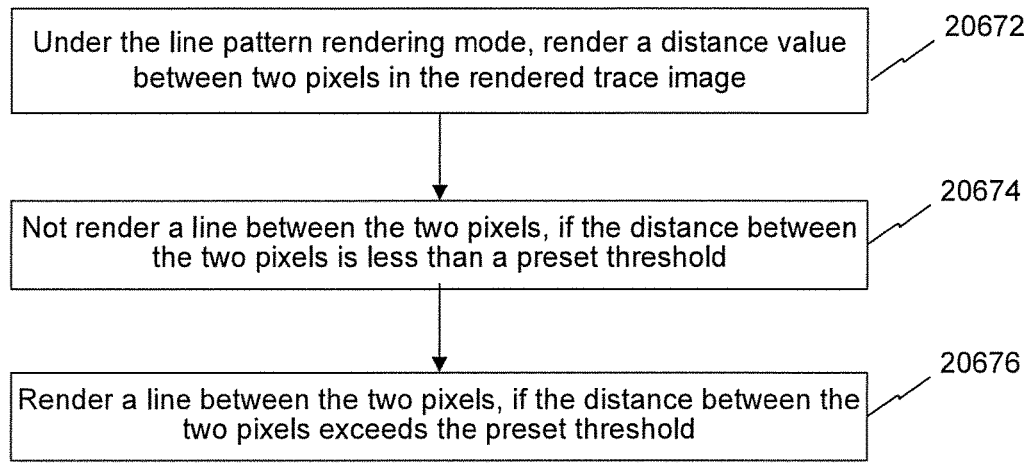
FIG. 2E is a flow diagram illustrating another method for data processing and display, according to an exemplary embodiment.

FIG. 2E is a flow diagram illustrating a method 200e for data processing and display, according to an exemplary embodiment. In some embodiments, under a line pattern rendering mode, after step S2066, method 200b may further include method 200e, which may include the following steps:

Step 20672: under the line pattern rendering mode, rendering a distance value between two pixels in the rendered trace image.

In Step 20672, the distance value can be rendered in a screen coordinate system or in a latitude-longitude coordinate system. For example, by obtaining a distance value between two pixels, e.g., two adjacent pixels of a target object, in the rendered trace image in a screen coordinate system, a corresponding distance value in a latitude-longitude coordinate system can be obtained based on the scaling value.

Step S20674: not rendering a line between the two pixels, if the distance between the two pixels is less than a preset threshold. This is described as a step for illustration purpose. In operation, this may not be an actual step, and the terminal device may not perform any actions.

Step S20676: rendering a line between the two pixels, if the distance between the two pixels exceeds the preset threshold.

In Step S20674 and Step S20676, if the distance value is in a screen coordinate system, the preset threshold can be represented by a number of pixels. The preset threshold can be a distance corresponding to one or more pixels in a screen coordinate system. If the distance value of step S20672 is in a latitude-longitude coordinate system, the preset threshold can be represented by a number of pixels. The preset threshold can be a distance corresponding to one or more pixels in a latitude-longitude coordinate system. When a distance between the two pixels is less than the preset threshold, the two pixels may not need to be connected.

In one example with respect to traffic flow in a critical traffic region of City A, when a display area is determined to be City A and when rendering a trace image of car M, a distance value between two sampling points in the display area may be less than a pixel, or the two sampling points may correspond to a same pixel in the display area. Thus, a line between the two pixels may not be rendered. When the display area is determined to be a part of a street of area B, and when rendering a trace image of car M, a distance value between two sampling points in the display area may be long. Thus, a line between the two pixels may be rendered.

A line pattern rendering mode can be realized by the above-described steps from S20672 to S20676. By determining if a line pattern rendering is necessary between any two points in the trace image, situations such as having too dense lines rendered can be prevented. Thus, unnecessary steps in rendering can be avoided and data processing amount can be reduced at the terminal device end.

Figure 2F:
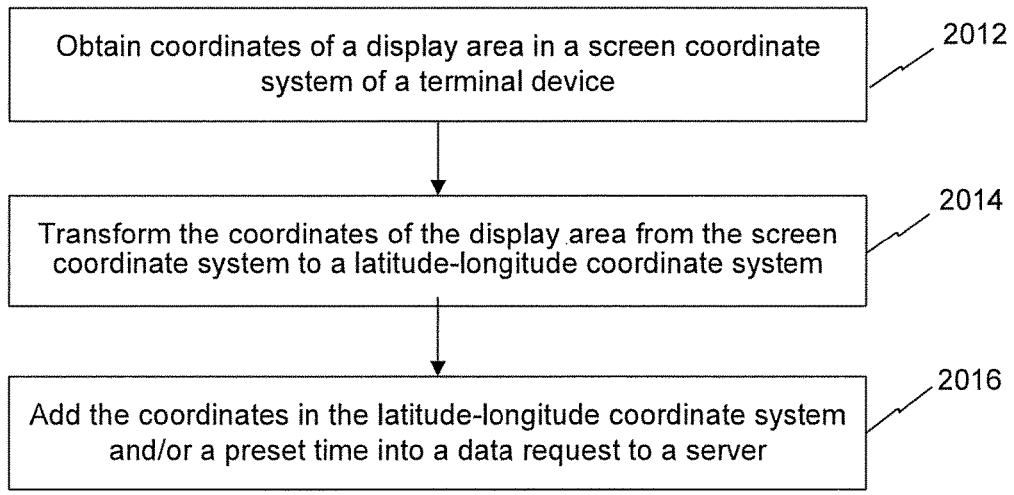
FIG. 2F is a flow diagram illustrating another method for data processing and display, according to an exemplary embodiment.

FIG. 2F is a flow diagram illustrating a method 200f for data processing and display, according to an exemplary embodiment. In some exemplary embodiments, before S202, method 200a may further include method 200f, which may comprise the following steps:

Step 2012, obtaining coordinates of a display area in a screen coordinate system of a terminal device.

In Step S2012, the terminal device may be a display terminal of a terminal device at client end. For example, the display area can be defined by two end points, e.g., [xMin, yMin] and [xMax, yMax], of its diagonal.

Step S2014: transforming the coordinates of the display area from the screen coordinate system to a latitude-longitude coordinate system.

In Step S2014, a corresponding relation between coordinates in the screen coordinate system and those in the latitude-longitude coordinate system can be determined by, for example, web Mercator transformation.

Step S2016: add the coordinates in the latitude-longitude coordinate system and/or a preset time into a data request to a server.

In Step S2016, the data request may include at least a display area of a window, e.g., coordinates of the display area in the latitude-longitude coordinate system. In addition, the data request may include a preset time, e.g., a preset time duration or time point.

By steps from S2012 to S2016, coordinates of the display area can be transformed between a screen coordinate system and a latitude-longitude coordinate system. Accordingly, the terminal device can generate the data request.

Figure 2G:
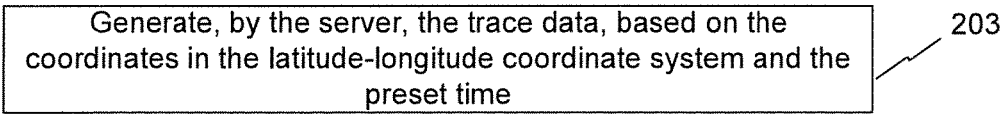
FIG. 2G is a flow diagram illustrating another method for data processing and display, according to an exemplary embodiment.

FIG. 2G is a flow diagram illustrating a method 200g for data processing and display, according to an exemplary embodiment. In some exemplary embodiments when the data request includes a preset time, after Step S202, method 200a may further include method 200g, which may include the following step:

Step 203: generating, by the server, the trace data, based on the coordinates in the latitude-longitude coordinate system and the preset time. The generated trace image data may include dynamic motion data collected on the target object in the display area in the preset time.

In Step 203, when position information stored in a database include coordinates of the target object in a latitude-longitude coordinate system, receiving, by the server, the request and obtaining, by the server, coordinates of the display area in the latitude-longitude coordinate system and the preset time. Based on the received coordinates and from a database, the sever may select target object possessing position information matching with the display area and time information matching with the preset time, as the trace image data.

Figure 2H:
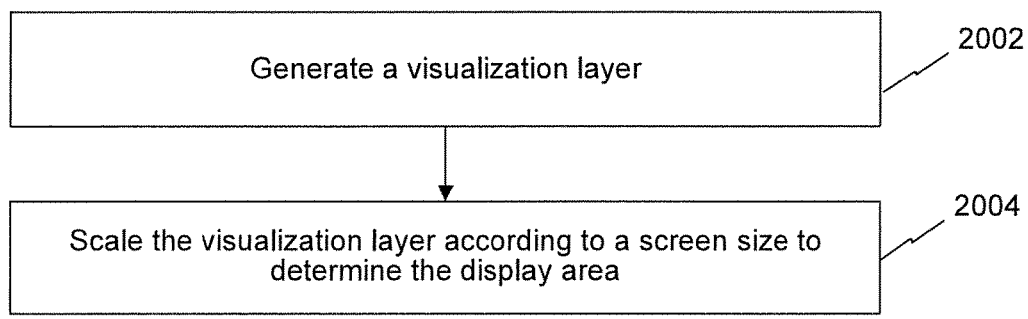
FIG. 2H is a flow diagram illustrating another method for data processing and display, according to an exemplary embodiment.

FIG. 2H is a flow diagram illustrating a method 200h for data processing and display, according to an exemplary embodiment. In some embodiments, before Step S202, method 200a may further include method 200h, which may include the following steps:

Step S2002: generating a visualization layer.

In Step S2002, the visualization layer can be a rendering layer of the trace data. Besides the visualization layer, a map layer for rendering the trace data can also be generated.

Step S2004: scaling the visualization layer according to a screen size to determine the display area.

By steps from S2002 to S2004, the display area in the screen can be determined.

Figure 2I:
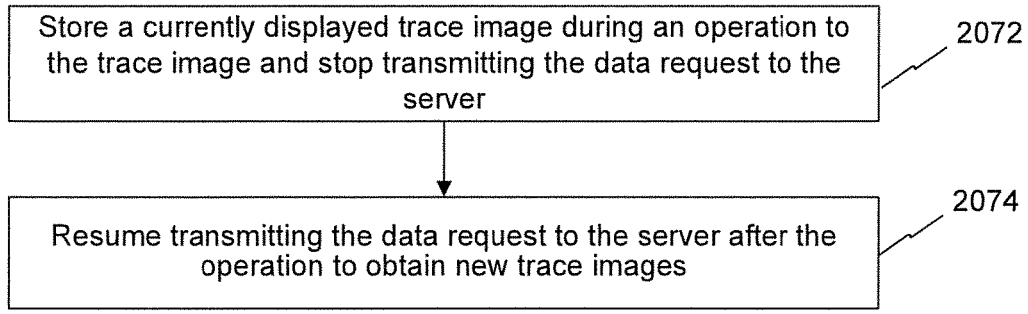
FIG. 2I is a flow diagram illustrating another method for data processing and display, according to an exemplary embodiment.

FIG. 2I is a flow diagram illustrating a method 200i for data processing and display, according to an exemplary embodiment. In some embodiments, after Step S206, method 200a may further comprise method 200i, which may include the following steps:

Step S2072: storing a currently displayed trace image during an operation to the trace image and stopping transmitting the data request to the server.

In Step S2072, the operation to the trace image may include moving, scaling, or rotating the trace image. Since rendered trace image position may not align with the map layer position after the operation, after detecting the operation, the rendering process may be stopped, a currently displayed trace image may be saved, and the transmission of the data request to the server may be stopped. If available, the saved trace image may include a map layer.

Step S2074: resuming transmitting the data request to the server after the operation. Thus, new trace images can be obtained.

In Step S2074, when the operation is finished, a new data request based on a post-operation status can be generated and transmitted to the server. The new data request may include coordinates of a post-operation display area in a latitude-longitude coordinate system and/or a preset time.

By steps from S2072 to S2074, where the display area is adjusted at the terminal device, the trace image can be properly displayed and promptly adjusted.

Figure 3:
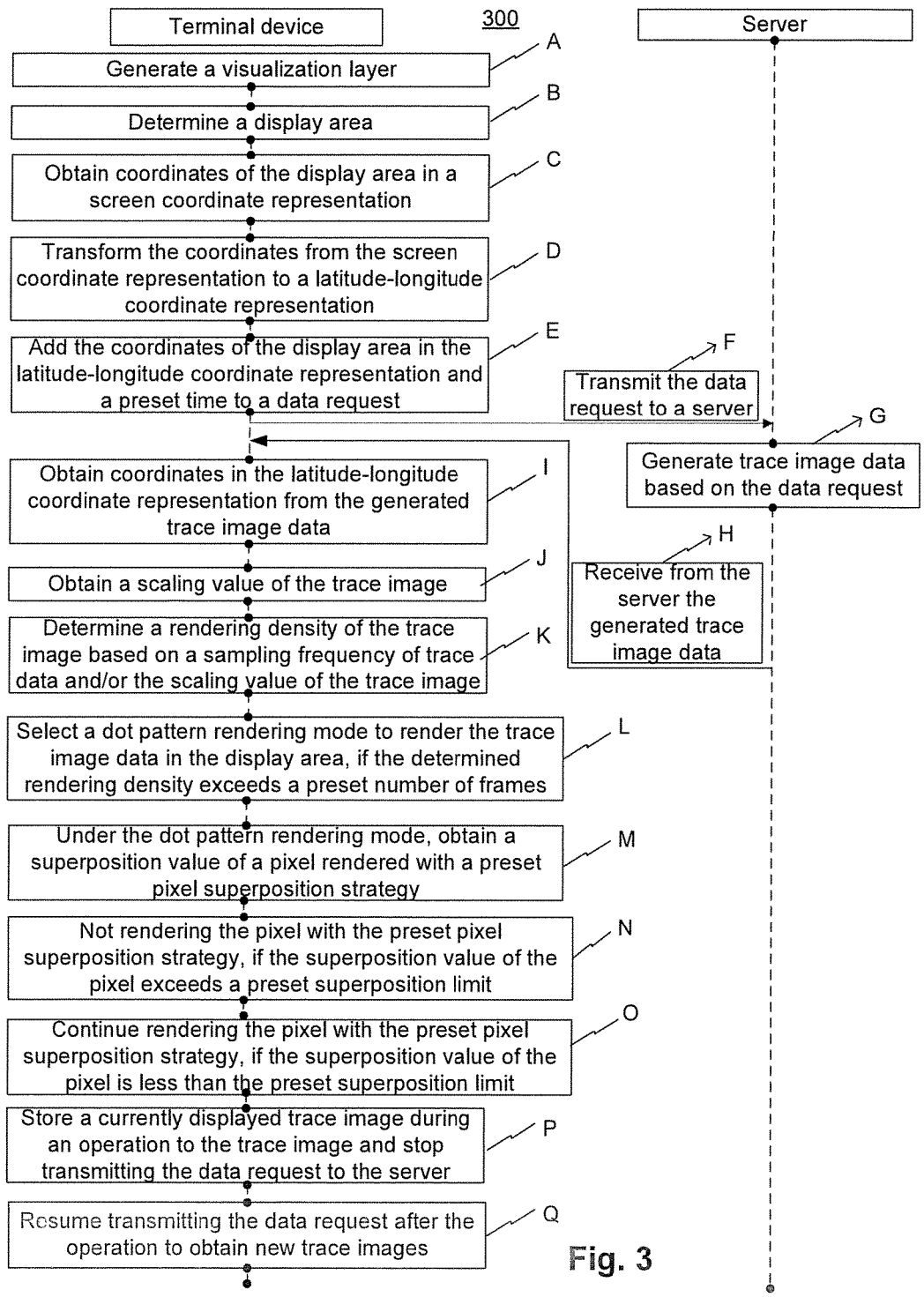
FIG. 3 is a flow diagram illustrating another method for data processing and display, according to an exemplary embodiment.

FIG. 3 is a flow diagram illustrating another method 300 for data processing and display, according to an exemplary embodiment. Method 300 may include a number of steps, some of which may be optional.

Step A: generating a visualization layer. The visualization layer can be a rendered trace image data layer. Besides the visualization layer, a map layer can also be generated to display geometric traits of the trace image.

Step B: determining a display area. The visualization layer can be scaled according to a display screen size, and a display area can be defined.

Step C: obtaining coordinates of the display area in a screen coordinate representation. The screen coordinate representation is based on a display screen coordinate system of a terminal device. For example, if the display area is rectangular, the display area can be determined/defined by two end points of its diagonal, e.g., [xMin, yMin] and [xMax, yMax].

Step D: transforming the coordinates from the screen coordinate representation to a latitude-longitude coordinate representation. By the transformation such as a web Mercator transformation, a transformation relation between the screen coordinate representation and the latitude-longitude coordinate representation can be established. Thus, a representation of the coordinates can be transformed from the screen coordinate system representation to the latitude-longitude coordinate system representation.

Step E: adding the coordinates of the display area in the latitude-longitude coordinate representation and a preset time to a data request. The data request may include the display area, e.g., the display area in the latitude-longitude coordinate representation. In addition, the data request may include a preset time, e.g., a preset time duration or a preset time point.

Step F: transmitting the data request to a server. To reduce the amount of data, e.g., unnecessary data, transmitted, the data request can include characterization data of the display area and the preset time, and limit types of data included in the data request.

Step G: generating trace image data based on the data request. The server may receive the data request and obtain the coordinates of the display area in the latitude-longitude coordinate representation and the preset time. Based on the received coordinates and from a database, the sever may select a target object possessing position information matching with the display area and time information matching with the preset time, as the trace image data. The generated trace image data may include dynamic motion data collected from the target object in the display area in the preset time.

Step H: receiving from the server the generated trace image data. The generated trace image data may include a combination of sampling points, which may include position information, time information, and identify information. The dynamic motion data stored in a database may be collected and compiled from sampling points yielded from various sampling methods. The various sampling methods may or may not have the same data format. Each of the various sampling methods may include at least one of location information, time information, or identity information.

Step I: obtaining coordinates in the latitude-longitude coordinate representation from the generated trace image data. Since the generated trace image data may include the dynamic motion data collected on the target object in the display area in the preset time, a terminal device may obtain the coordinates (of the display area) in the latitude-longitude coordinate representation from the received trace image data.

Step J: obtaining a scaling value of the trace image. To properly display the trace image on a screen, a scaling value may be needed. In some embodiments, the scaling value can be determined by a ratio of latitude-longitude coordinates of any two points in the display area to screen coordinates of the two points in a display screen of the terminal device.

Step K: determining a rendering density of the trace image based on a sampling frequency of trace data and/or the scaling value of the trace image. The rendering density of the trace image may be related to a sampling frequency and/or the scaling value of trace image. Based on the determined rendering density, a dot or line pattern rendering mode can be selected.

In the following steps, a dot pattern rendering mode is used as an example. If a line patter rendering mode is used, the steps may be different from the steps shown in FIG. 3.

Step L: selecting a dot pattern rendering mode to render the trace image data in the display area, if the determined rendering density exceeds a preset number of frames per second. The preset number of frames per second can be used to determine if the rendering density is within a reasonable range for rendering the trace data image. For example, as discussed above, the rendering density of trace image may be determined based on a number of frames rendered within a predetermined time interval (e.g., one second). If, at a particular sampling frequency, the determined rendering density exceeds a preset number of frames per second, the trace image, as rendered with the dot pattern rendering mode, may appear to a user as a continuous animation, and lines may not be needed to ensure continuity among dots.

Step M: under the dot pattern rendering mode, obtaining a superposition value of a pixel rendered with a preset pixel superposition strategy. To differentiate superimposing sampling points, when rendering the trace image, a corresponding display situation for each pixel can be determined according to a preset pixel superposition strategy. A superposition value can be obtained based on the corresponding display situation of the pixel.

Step N: not rendering the pixel with the preset pixel superposition strategy, if the superposition value of the pixel exceeds a preset superposition limit. When the superposition value of a pixel exceeds a preset superposition limit, it may be unimportant to render the pixel in the display area, which may not affect the display effect. To avoid unnecessary overlapping of rendered images, the pixel may not be rendered in the display area.

Step O: rendering the pixel with the preset pixel superposition strategy, if the superposition value of the pixel is less than the preset superposition limit. When the superposition value of the pixel is less than the preset superposition limit, and to differentiate the sampling points of the pixel, it may still be necessary to display the pixel corresponding to the sample point with different display effects.

Step P: storing a currently displayed trace image during an operation to the trace image and stopping transmitting the data request to the server. The operation to the trace image may include moving, scaling, or rotating the trace image. Since rendered trace image position may not align with the map layer position after the operation, after detecting the operation, the rendering process may be stopped, a currently displayed trace image may be saved, and the transmission of the data request to the server may be stopped. If available, the saved trace image may include a map layer.

Step Q: resuming transmitting the data request to the server to obtain new trace images after finishing the operation to the trace image. When the operation is finished, a new data request based on a post-operation status can be generated and transmitted to the server. The new data request may include coordinates of a post-operation display area in a latitude and longitude coordinate system and/or a preset time.

Figure 4:
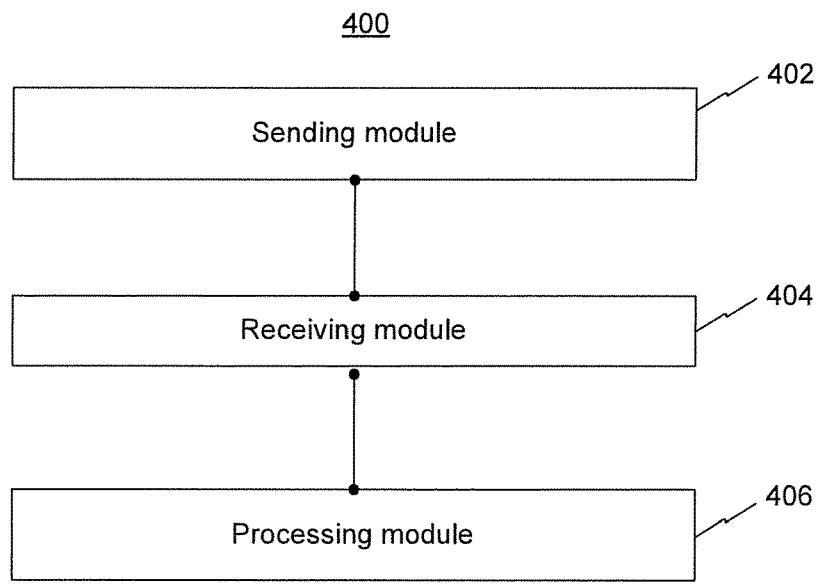
FIG. 4 is a block diagram illustrating an apparatus for data processing and display, according to an exemplary embodiment.

According to another aspect of the present disclosure, an apparatus for processing and rendering trace data is provided. FIG. 4 is a block diagram illustrating an apparatus 400 for processing and rendering data, according to an exemplary embodiment. Apparatus 400 may include a sending module 402, a receiving module 404, and a processing module 406.

Sending module 402 may be configured to transmit a data request to a server, the data request including at least a display area of a window.

Receiving module 404 may be configured to receive trace data from the server according to the data request, the trace data including dynamic motion data of a target object within the display area.

Processing module 406 may be configured to select and use preset rules for rendering images to process trace data, where the rules may include selecting a method of rendering images (a first rule) and/or deleting redundant trace data (a second rule).

Accordingly, a terminal device may transmit data request for data included in display area in a window, and may receive trace data provided by the server based on the data request including dynamic motion data of target objects in the display area. Additionally, by selecting preset rendering rules, the terminal device may process received trace data and render a trace image. In one embodiment, the terminal device may receive trace data, instead of rendered trace image information, from the server, such that the trace image displayed at the terminal device is rendered based on the received trace data in real time. The disclosed method can resolve the issues occurred when a terminal device receives trace image from a backend server, and issues relating to not being able to timely display trace image at the terminal device, as the trace image rendered by the backend server has delays.

Sending module 402, receiving module 404, and processing module 406 may be configured to perform steps from S202 to S206, and may be included in terminal device 10 described above, as hardware, software, or a combination of both.

With sending module 402, receiving module 404, and processing module 406, a terminal device, instead of a server, can conduct operations of trace data processing and trace image rendering for realizing the visualization of trace data. The terminal device can be a mobile terminal, a computer terminal, or similar computing devices. By transmitting data request, a terminal device can receive trace data and render an image in a window for dynamic display. In circumstances when display region changes quickly, the disclosed methods can smoothly switch trace data, and maintain stability and aesthetics.

Accordingly, a terminal device may transmit data request for data included in display area in a window, and may receive trace data provided by the server based on the data request including dynamic motion data of target objects in the display area. Additionally, by selecting preset rendering rules, the terminal device may process received trace data and render a trace image. In one embodiment, the terminal device may receive trace data, instead of rendered trace image information, from the server, such that the trace image displayed at the terminal device is rendered based on the received trace data in real time. The disclosed method can resolve the issues occurred when a terminal device receives trace image from a backend server, and issues relating to not being able to timely display trace image at the terminal device, as the trace image rendered by the backend server has delays.

Transmitting the data request to the server can employ one of the following methods: sending a real-time data request, transmitting data requests according to a preset time interval, or after receiving trace data according to a first data request, sending a second data request.

The rendering method may include dot pattern rendering mode and line pattern rendering mode.

Figure 5:
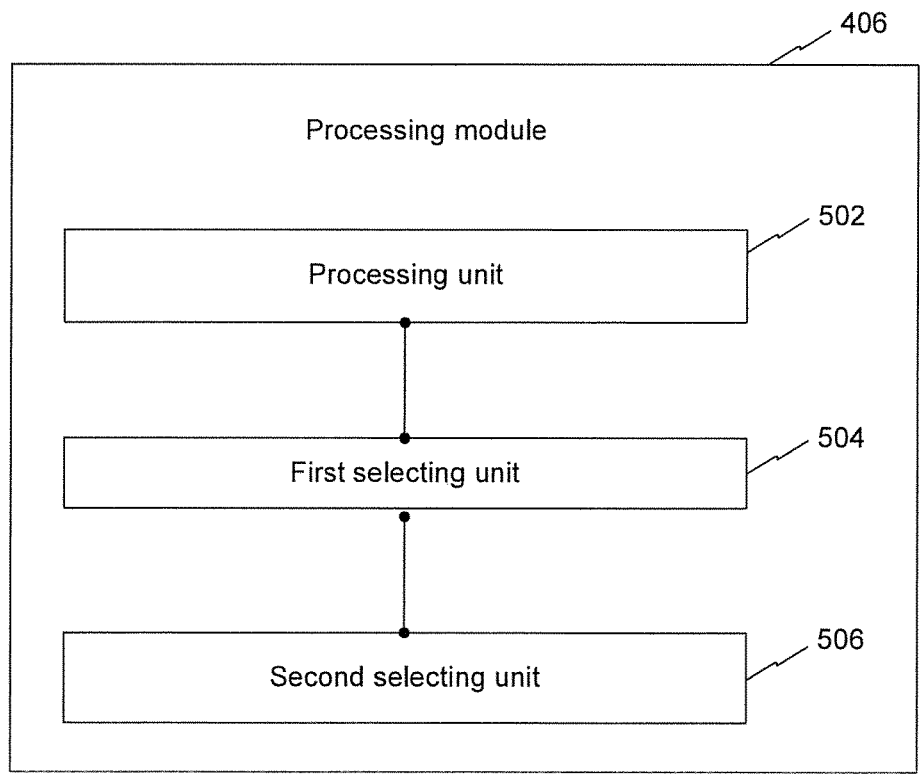
FIG. 5 is a block diagram illustrating a processing module for data processing and display, according to an exemplary embodiment of FIG. 4.

FIG. 5 is a block diagram illustrating a processing module 406 for data processing and display, according to an exemplary embodiment of FIG. 4. As illustrated in FIG. 5, processing module 406 may include a processing unit 502, a first selecting unit 504, and a second selecting unit 506.

Processing unit 502 may be configured to determine a rendering density of trace image, based on a sampling frequency of trace data and/or a scaling of trace image.

First selecting unit 504 may be configured to select a dot pattern rendering mode to render trace data in the display area, when the rendering density of trace image is greater than a preset number of frames within a predetermined time interval.

Second selectin unit 506 may be configured to select a line pattern rendering mode to render trace data in display area, when the rendering density of trace image is smaller than a preset number of frames within a predetermined time interval.

Processing unit 502, first selecting unit 504, and second selecting unit 506 may be configured to perform steps from S2062 to S2064, and may be included in terminal device 10 described above, as hardware, software, or a combination of both.

By processing unit 502, first selecting unit 504, and second selection unit 506, a rendering density can be obtained, and, due to the flexibility of selecting rendering methods, cost of rendering can be reduced and various effects of rendering are satisfied. The one embodiment can provide flexibility in adjusting rendering methods or modes based on sampling frequency of trace data and map scaling, and can provide a balanced approach between visualization and efficiency of front-end rendering.

Figure 6:
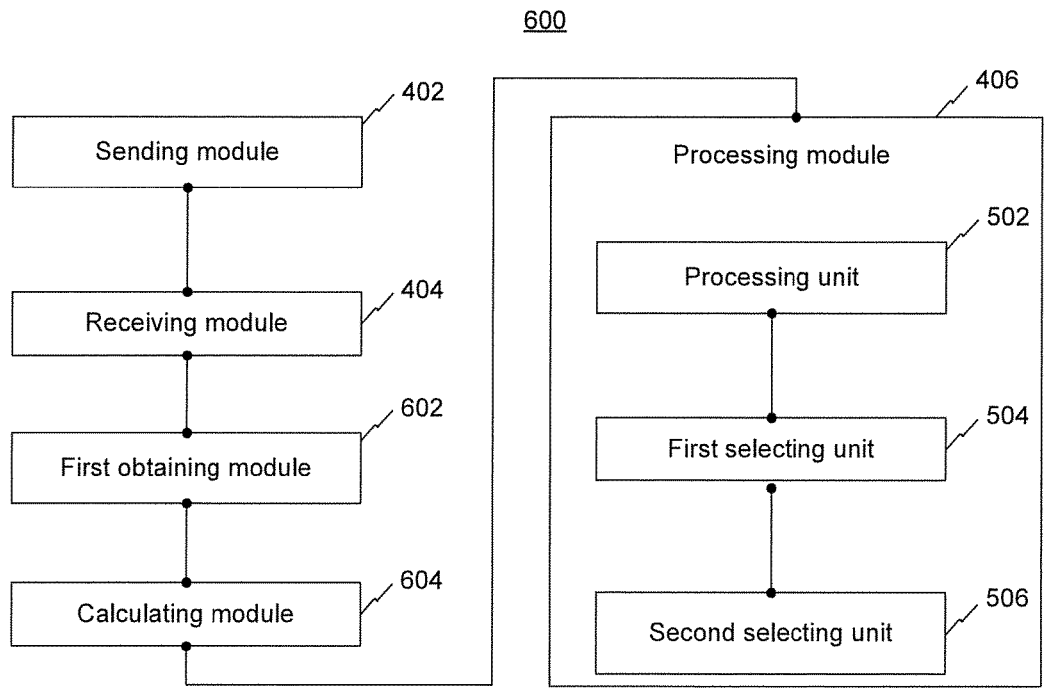
FIG. 6 is a block diagram illustrating another apparatus for data processing and display, according to an exemplary embodiment.

FIG. 6 is a block diagram illustrating another apparatus 600 for data processing and display, according to an exemplary embodiment. Apparatus 600 may include a first obtaining module 602 and a calculating module 604.

First obtaining module 602 may be configured to obtain, from the trace data, latitude and longitude coordinates of the display area.

Calculating module 604 may be configured to compare the obtained latitude and longitude coordinates with screen coordinates of the display area in a screen of the terminal device to obtain a scaling value of the trace image.

First obtaining module 602 and a calculating module 604 may be configured to perform steps from S2060 to S2061, and may be included in terminal device 10 described above, as hardware, software, or a combination of both.

By first obtaining module 602 and a calculating module 604, the scaling value of the trace image can be determined by obtaining latitude and longitude coordinates from trace image data returned by the server, and calculating a corresponding relation between the display area in a latitude-longitude coordinate and a screen coordinate of a terminal device. Thus, the trace image can be accurately displayed.

Figure 7:
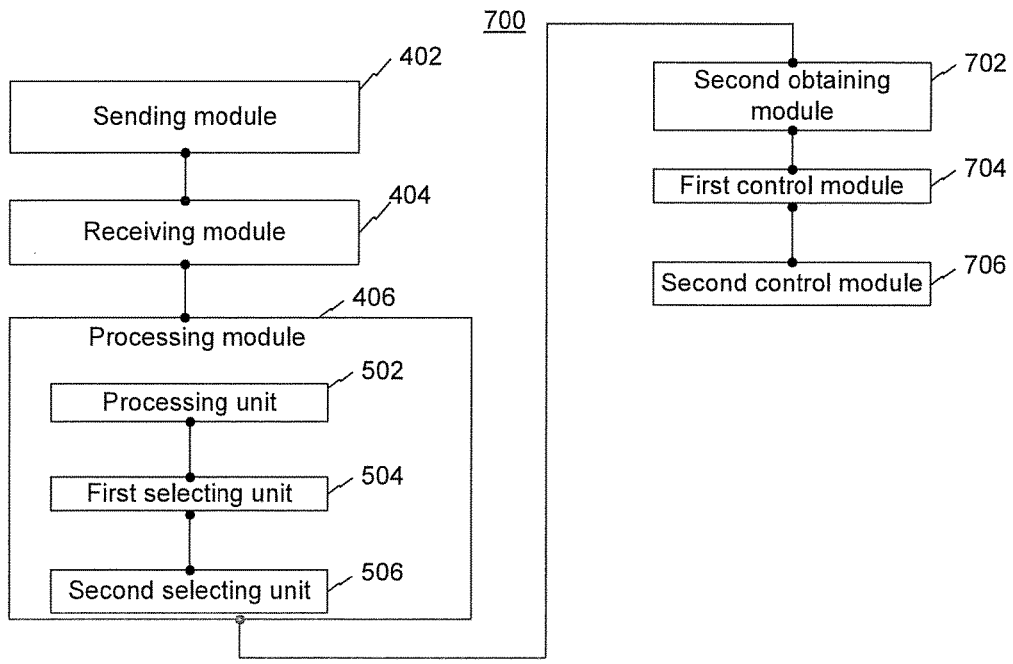
FIG. 7 is a block diagram illustrating another apparatus for data processing and display, according to an exemplary embodiment.

FIG. 7 is a block diagram illustrating another apparatus 700 for data processing and display, according to an exemplary embodiment. Apparatus 700 may include a second obtaining module 702, a first control module 704, and a second control module 706.

Second obtaining module 702 may be configured to, under the dot pattern rendering mode, obtain a superposition value of a pixel rendered with a preset pixel superposition strategy.

First control module 704 may be configured to stop rendering the pixel corresponding to a sampling point, if the superposition value of the pixel exceeds a preset superposition limit.

Second control module 706 may be configured to continue rendering the pixel corresponding to a sampling point, if the superposition value of the pixel is less than the preset superposition limit.

Second obtaining module 702, first control module 704, and second control module 706 may be configured to perform steps from S20652 to S20656. In some embodiments, the first and second control module 704 and 706 may be one module, which is configured to render the pixel corresponding to a sampling point, if the superposition value of the pixel is less than the preset superposition limit, and not to render the pixel corresponding to a sampling point, if the superposition value of the pixel exceeds the preset superposition limit. The modules may be included in terminal device 10 described above, as hardware, software, or a combination of both.

By second obtaining module 702, first control module 704, and second control module 706, the pixel superposition strategy can be used. Based on a different number of superimposed sampling points on pixels of the rendered trace image, different display effects can be used on the pixels. By obtained the superposition value and comparing with the preset superposition limit, whether continuing rendering the pixel with the preset pixel superposition strategy can be determined, avoiding unnecessary overlapping rendered images and reducing amount of data for processing at a terminal device end.

Figure 8:
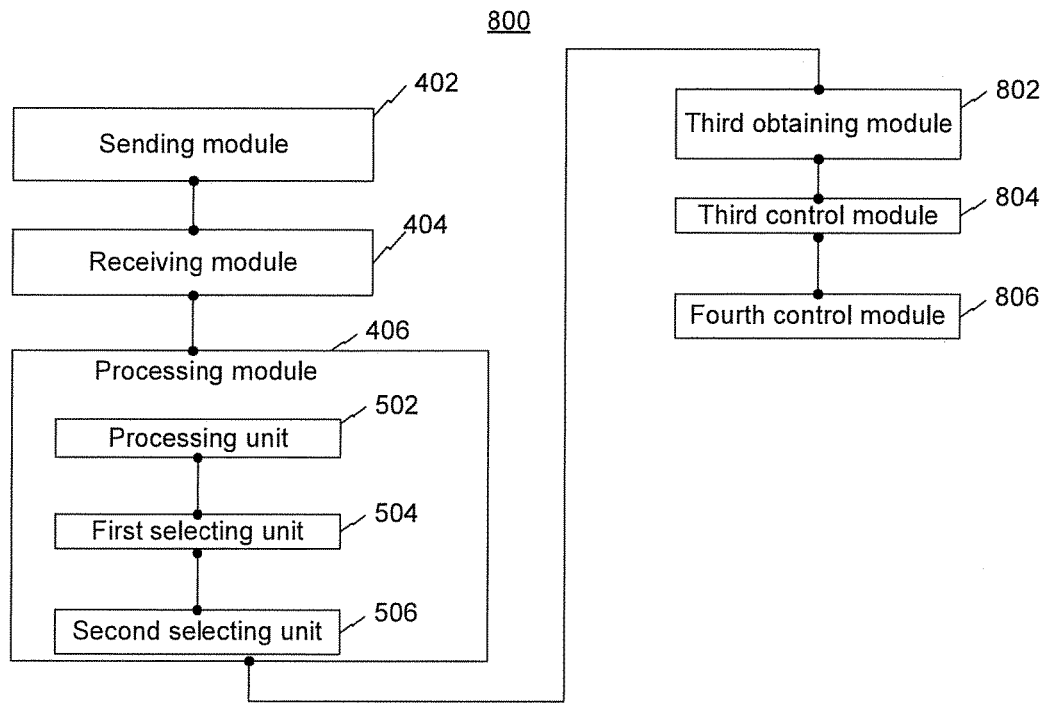
FIG. 8 is a block diagram illustrating another apparatus for data processing and display, according to an exemplary embodiment.

FIG. 8 is a block diagram illustrating another apparatus 800 for data processing and display, according to an exemplary embodiment. Apparatus 800 may include a third obtaining module 802, a third control module 804, and a fourth control module 806.

Third obtaining module 802 may be configured to, under the line pattern rendering mode, render a distance value between two pixels in the rendered trace image.

Third control module 804 may be configured to prevent rendering a line between the two pixels, if the distance between the two pixels is less than a preset threshold.

Fourth control module 806 may be configured to render a line between the two pixels, if the distance between the two pixels exceeds the preset threshold.

Third obtaining module 802, third control module 804, and fourth control module 806 may be configured to perform steps from S20672 to S20676. In some embodiments the third control module 804 and fourth control module 806 may be one module, which is configured to not render a line between the two pixels if the distance between the two pixels is less than a preset threshold, and render a line between the two pixels, if the distance between the two pixels exceeds the preset threshold. The modules may be included in terminal device 10 described above, as hardware, software, or a combination of both.

By third obtaining module 802, third control module 804, and fourth control module 806, a line pattern rendering mode can be realized. By determining if a line pattern rendering is necessary between any two points in the trace image, situations such as having too dense lines rendered can be prevented. Thus, unnecessary steps in rendering can be avoided and data processing amount can be reduced at terminal device end.

Figure 9:
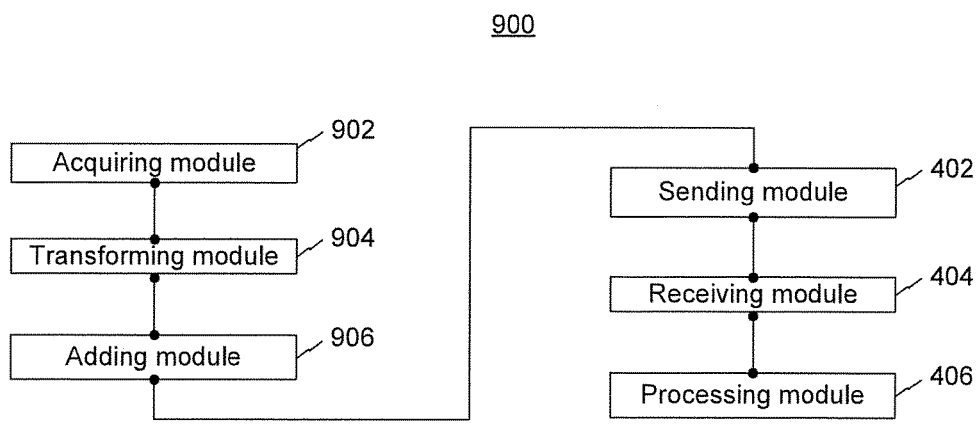
FIG. 9 is a block diagram illustrating another apparatus for data processing and display, according to an exemplary embodiment.

FIG. 9 is a block diagram illustrating another apparatus 900 for data processing and display, according to an exemplary embodiment. Apparatus 900 may include an acquiring module 902, a transforming module 904, and an adding module 906.

Acquiring module 902 may be configured to obtain coordinates of a display area in a screen coordinate system of a terminal device.

Transforming module 904 may be configured to transform the coordinates of the display area from the screen coordinate system to a latitude-longitude coordinate system.

Adding module 906 may be configured to add the coordinates in the latitude-longitude coordinate system and/or a preset time into a data request to a server.

Acquiring module 902, transforming module 904, and adding module 906 may be configured to perform steps from S2012 to S2016, and may be included in terminal device 10 described above, as hardware, software, or a combination of both.

By acquiring module 902, transforming module 904, and adding module 906, coordinates of the display area can be transformed between a screen coordinate system and a latitude-longitude coordinate system. Accordingly, the terminal device can generate the data request.

Figure 10:
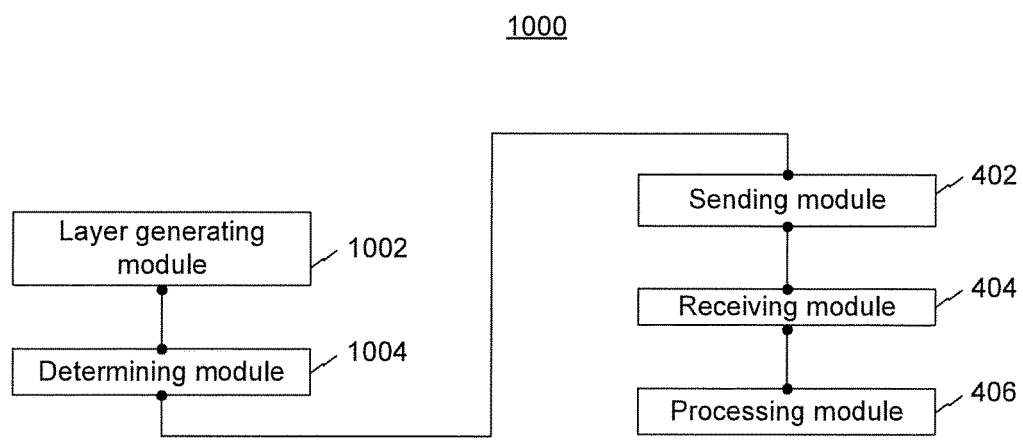
FIG. 10 is a block diagram illustrating another apparatus for data processing and display, according to an exemplary embodiment.

FIG. 10 is a block diagram illustrating an apparatus 1000 for data processing and display, according to an exemplary embodiment. Apparatus 1000 may include layer generating module 1002 and determining module 1004.

Generating module 1002 may be configured to generate a visualization layer.

Determining module 1004 may be configured to scale the visualization layer according to a screen size to determine the display area.

Layer generating module 1002 and determining module 1004 may be configured to perform steps from S2002 to S2004, and may be included in terminal device 10 described above, as hardware, software, or a combination of both.

By layer generating module 1002 and determining module 1004, the display area in the screen can be determined.

Figure 11:
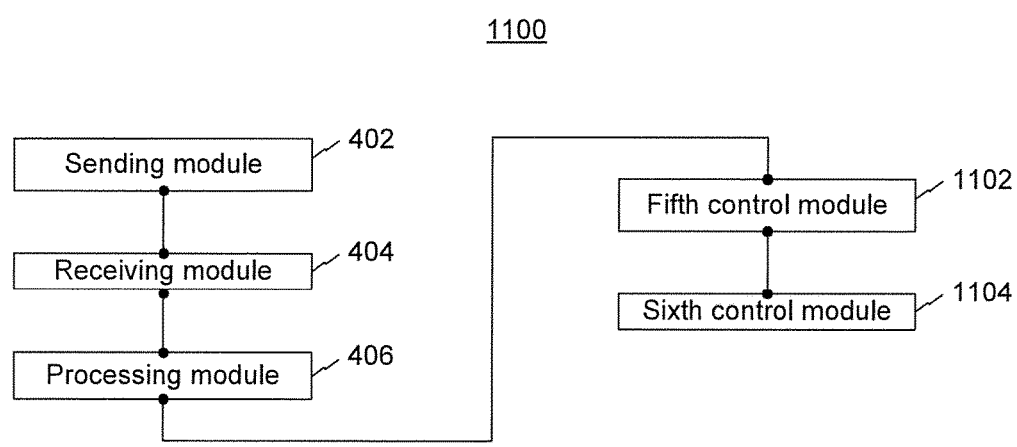
FIG. 11 is a block diagram illustrating another apparatus for data processing and display, according to an exemplary embodiment.

FIG. 11 is a block diagram illustrating an apparatus 1100 for data processing and display, according to an exemplary embodiment. Apparatus 1100 may include a fifth control module 1102 and a sixth control module 1104.

Fifth control module 1102 may be configured to store a currently displayed trace image during an operation to the trace image and stopping transmitting the data request to the server.

Sixth control module 1104 may be configured to resume transmitting the data request to the server after the operation. Thus, new trace images can be obtained.

Fifth control module 1102 and sixth control module 1104 may be configured to perform steps from S2072 to S2074, and may be included in terminal device 10 described above, as hardware, software, or a combination of both.

With Fifth control module 1102 and sixth control module 1104, the display area can be adjusted at the terminal device, and the trace image can be properly displayed and promptly adjusted.

Figure 12:
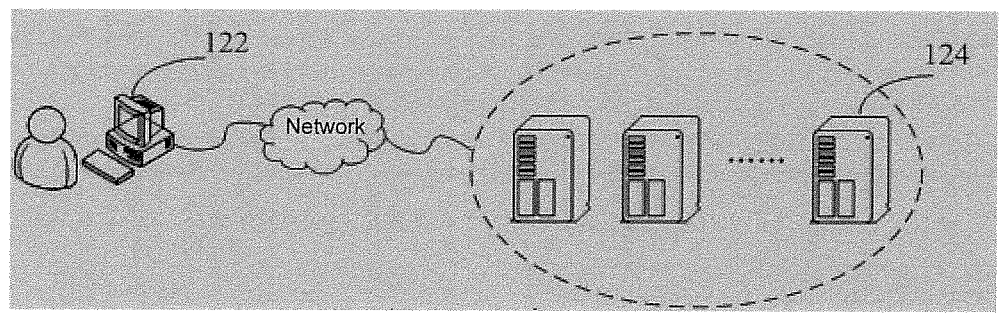
FIG. 12 is a block diagram illustrating a system for data processing and display, according to an exemplary embodiment.

According to another aspect, the present disclosure provides a system for collecting trace data and displaying the trace data. FIG. 12 is a block diagram illustrating a system 1200 for data processing and display, according to an exemplary embodiment.

System 1200 may include a server 124 configured to store trace data of a target object.

System 1200 may also include at least one terminal device 122 configured to communicate with server 124. The communication may include transmitting a data request to server 124, the data request including at least a display area of a window, receiving the stored trace data from the server 124 according to the data request, the trace data including dynamic motion data of a target object within the display area, and using preset rules for rendering images to process trace data, where the rules may include selecting a method of rendering images (a first rule) and/or deleting redundant trace data (a second rule).

Accordingly, a terminal device may transmit data request for data included in display area in a window, and may receive trace data provided by the server based on the data request including dynamic motion data of target objects in the display area. Additionally, by selecting preset rendering rules, the terminal device may process received trace data and render a trace image. In one embodiment, the terminal device may receive trace data, instead of rendered trace image information, from the server, such that the trace image displayed at the terminal device is rendered based on the received trace data in real time. The disclosed method can resolve the issues occurred when a terminal device receives trace image from a backend server, and issues relating to not being able to timely display trace image at the terminal device, as the trace image rendered by the backend server often has delays.

According to a further aspect of the present disclosure, the terminal device as described above can be a computer terminal. The terminal device can be one within a terminal device cluster. The terminal device can also be a mobile terminal device. The terminal device can be connected to a computer network.

The terminal device may be configured to transmit a data request to a server, the data request including at least a display area of a window, receive trace data from the server according to the data request, the trace data including dynamic motion data of a target object within the display area, and use preset rules for rendering images to process trace data, where the rules may include selecting a method of rendering images (a first rule) and/or deleting redundant trace data (a second rule).

Figure 13:
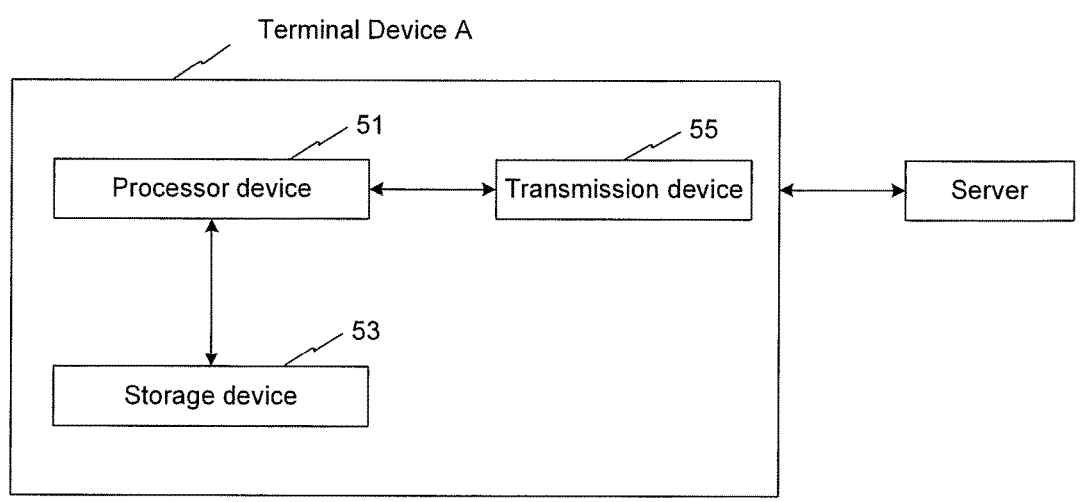
FIG. 13 is a block diagram illustrating a terminal device, according to an exemplary embodiment.

FIG. 13 is a block diagram illustrating a terminal device A, according to an exemplary embodiment. Terminal device A may include at least one processor device 51, storage device 53, and transmission device 55.

Storage device 53 may store software programs or modules, such as programs or modules implementing a method for processing data visualization described in the present disclosure. Processor device 51 may, by executing programs or modules stored in storage device 53, conduct data processing, fault detection, and various applications. Storage device 53 may include a high-speed random access memory, a non-volatile storage device, one or more magnetic storage device, a flash memory, or other non-volatile solid state storage device. In some embodiments, storage device 53 may further include a remote storage device which connects to terminal device A through a network, including but not limited to: the Internet, an intranet, local area network, a mobile communication network, a wireless network, or a combination thereof.

Transmission device 55 may receive or transmit data through a network. In some embodiments, transmission device 55 includes a network interface controller (NIC), which communicates with the Internet through a base station and network equipment. In some embodiments, transmission device 55 includes a radio frequency (RF) module, which communicates with the Internet wirelessly. Further, terminal device A can be a display terminal. In some embodiments, storage device 53 may store preset conditions, preset authorized user information, and programs.

Processor device 51 may execute information and programs stored in storage device 53 to implement the steps and methods described above, such as steps S202, S204, S206, S2062, S2064, S2066, S2060, S2061, S20652, S20654, S20656, S20672, S20674, S20676, S2012, S2014, S2016, S2012, S2014, S2016, S203, S2002, S2004, S2072, and S2074 shown in FIGS. 2A-2I and steps A-Q in FIG. 3.

Accordingly, the present disclosure provides a terminal device that may transmit data request for data included in display area in a window, and may receive trace data provided by the server based on the data request including dynamic motion data of target objects in the display area. Additionally, by selecting preset rendering rules, the terminal device may process received trace data and render a trace image. In one embodiment, the terminal device may receive trace data, instead of rendered trace image information, from the server, such that the trace image displayed at the terminal device is rendered based on the received trace data in real time. The disclosed method can resolve the issues occurred when a terminal device receives trace image from a backend server, and issues relating to not being able to timely display trace image at the terminal device, as the trace image rendered by the backend server has delays.

In some embodiments, the terminal device may be a smart mobile phone such as an Android or iOS phone, tablet, pad, or Mobile Internet Devices (MID). The terminal device may include more or less components, such as internet ports, display devices.

According to a further aspect, the present disclosure further provides a non-transitory computer-readable storage medium that may embody as a computer program product, e.g., a computer program, for processing and displaying data as described above. The computer program product may comprise instructions configured to cause a computing device to perform steps and methods described above, such as steps S202, S204, S206, S2062, S2064, S2066, S2060, S2061, S20652, S20654, S20656, S20672, S20674, S20676, S2012, S2014, S2016, S2012, S2014, S2016, S203, S2002, S2004, S2072, and S2074 shown in FIGS. 2A-2I and steps A-Q in FIG. 3. The non-transitory computer-readable storage medium may be included in a terminal device in a network or a mobile terminal device. The terminal device can communicate with a server and/or a scanner. The scanner can scan web application execution orders in php from the terminal device.

A person skilled in the art can further understand that, various exemplary logic blocks, modules, circuits, and algorithm steps described with reference to the disclosure herein may be implemented as electronic hardware, computer software, or a combination of electronic hardware and computer software. For examples, the modules/units may be implemented by a processor executing software instructions stored in the computer-readable storage medium.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. In some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware. Furthermore, embodiments of the present disclosure may take the form of a computer program product embodied in one or more computer-readable storage media (including but not limited to a magnetic disk memory, a CD-ROM, an optical memory and so on) containing computer-readable program codes.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable storage medium includes non-volatile and volatile media, and removable and non-removable media, wherein information storage can be implemented with any method or technology. Information may be modules of computer-readable instructions, data structures and programs, or other data. Examples of a computer-readable storage medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a memory register, or any other non-transmission media that may be used to store information capable of being accessed by a computer device. The computer-readable storage medium is non-transitory, and does not include transitory media, such as modulated data signals and carrier waves.

The specification has described methods, apparatus, and systems for data processing and display. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A terminal device for data processing, comprising:
   a memory that stores a set of instructions; and
   one or more processors configured to execute the set of instructions to cause the terminal device to:
   transmit a data request to a server, the data request includes at least data associated with a display area and wherein the transmission of the data request to the server includes at least one of:
   transmit the data request in real time,
   transmit the data request after a preset time interval elapses, and
   transmit a next data request, after receiving trace data according to the data request,
   receive trace data from the server according to the data request, the trace data including dynamic motion data of a target object within the display area;
   process the received trace data to determine a rendering density of a trace image to be rendered based on at least one of a sampling frequency of the received trace data and a scaling value of the trace image;
   select, based on the rendering density, a dot pattern rendering mode or a line pattern rendering mode for rendering the trace image; and
   render the trace image based on the selected pattern rendering mode
   wherein when the rendering density of the trace image is greater than a first threshold, select the dot pattern rendering mode to render the received trace data and when the rendering density of the trace image is less than the first threshold, select the line pattern rendering mode to render the received trace data.

2. The terminal device of claim 1, wherein the received trace data is processed to render the trace image according to at least one of a first rule to render images or a second rule to delete redundant trace data.

3. The terminal device of claim 1, wherein before determining the rendering density of the trace image, obtain from the received trace data latitude and longitude coordinates of the display area and compare the latitude and longitude coordinates with screen coordinates of the display area in a screen of the terminal device to obtain the scaling value of the trace image.

4. The terminal device of claim 1, wherein the dot pattern rendering mode to render the received trace data includes:
   obtain a superposition value of a pixel rendered according to a pixel superposition strategy; and
   render the pixel according to the pixel superposition strategy if the superposition value of the pixel is less than a preset superposition limit.

5. The terminal device of claim 1, wherein the line pattern rendering mode to render the received trace data includes:
   obtain a distance value between two pixels in the rendered trace image; and
   render a line between the two pixels if the distance between the two pixels exceeds a second threshold.

6. The terminal device of claim 1, wherein before transmitting the data request to the server:
   obtain coordinates of a display area in a screen coordinate system; and
   transform the coordinates of the display area from the screen coordinate system to a latitude-longitude coordinate system and wherein the data request includes the coordinates in the latitude-longitude coordinate system.

7. The terminal device of claim 6, wherein before transmitting the data request to the server further includes:
generate a visualization layer; and
scale the visualization layer according to a screen size to determine a display area.

8. The terminal device of claim 7, wherein the data request to the server includes information related to a preset interval, wherein the information:
enables the server to determine the trace data based on coordinates of the display area in a latitude-longitude coordinate system and the preset interval; and
wherein the trace data includes dynamic motion data of a target object within the display area within the preset interval.

9. A non-transitory computer-readable storage medium that stores a set of instructions that is executable by at least one processor of a terminal device to cause the terminal device to perform a method for processing data, the method comprising:
transmitting, by a terminal device, a data request to a server, the data request including at least data associated with a display area and wherein the transmitting of the data request to the server includes at least one of:
transmitting the data request in real time,
transmitting the data request after a preset time interval elapses, and
transmitting a next data request, after receiving trace data according to the data request,
receiving trace data from the server according to the data request, the trace data including dynamic motion data of a target object within the display area;
processing the received trace data to determine a rendering density of a trace image to be rendered based on at least one of a sampling frequency of the received trace data and a scaling value of the trace image;
selecting, based on the rendering density, a dot pattern rendering mode or a line pattern rendering mode for rendering the trace image; and
rendering the trace image based on the selected pattern rendering mode,
wherein when the rendering density of the trace image is greater than a first threshold, selecting a dot pattern rendering mode to render the received trace data and when the rendering density of the trace image is less than the first threshold, selecting a line pattern rendering mode to render the received trace data.

10. The non-transitory computer-readable storage medium of claim 9, wherein receiving the trace data from the server is processed to rendering the trace image according to at least one of a first rule to rendering images or a second rule to deleting redundant trace data.

11. The non-transitory computer-readable storage medium of claim 9, wherein before determining the rendering density of the trace image, obtaining from the received trace data latitude and longitude coordinates of the display area and comparing the latitude and longitude coordinates with screen coordinates of the display area in a screen of the terminal device to obtain the scaling value of the trace image.

12. The non-transitory computer-readable storage medium of claim 9, wherein the dot pattern rendering mode to rendering the received trace data includes:
obtaining a superposition of a value of a pixel rendered according to a pixel superposition strategy; and
rendering the pixel according to the pixel superposition strategy if the superposition value of the pixel is less than a preset superposition limit.

13. The non-transitory computer-readable storage medium of claim 9, wherein the line pattern rendering mode to rendering the received trace data includes:
obtaining a distance value between two pixels in the rendered trace image; and
rendering a line between the two pixels if the distance between the two pixels exceeds a second threshold.

14. The non-transitory computer-readable storage medium of claim 9, wherein before transmitting the data request to the server:
obtaining coordinates of a display area in a screen coordinate system; and
transforming the coordinates of the display area from the screen coordinate system to a latitude-longitude coordinate system and wherein the data request including coordinates in the latitude-longitude coordinate system.

15. The non-transitory computer-readable storage medium of claim 14, wherein before transmitting the data request to the server further including:
generating a visualization layer; and
scaling the visualization layer according to a screen size to determine a display area.

16. The non-transitory computer-readable storage medium of claim 15, wherein the data request to the server including information related to a preset interval, wherein the information:
enabling the server to determine the trace data on coordinates of the display area in a latitude-longitude coordinate system and the preset interval; and
wherein the trace data including dynamic motion data of a target object within the display area within the preset interval.

17. A method for processing data, comprising:
transmitting a data request to a server, the data request includes at least data associated with a display area, and wherein the transmission of the data request to the server includes at least one of:
transmitting the data request in real time,
transmitting the data request after a preset time interval elapses, and
transmitting a next data request, after receiving trace data according to the data request,
receiving trace data from the server according to the data request, the trace data including dynamic motion data of a target object within the display area;
processing the received trace data to determine a rendering density of a trace image to be rendered based on at least one of a sampling frequency of the received trace data and a scaling value of the trace image;
selecting, based on the rendering density, a dot pattern rendering mode or a line pattern rendering mode for rendering the trace image, wherein:
the dot pattern rendering mode is selected when the rendering density of the trace image is greater than a first threshold, and
the line pattern rendering mode is selected when the rendering density of the trace image is less than the first threshold; and
rendering the trace image based on the selected pattern rendering mode.

18. The method of claim 17, wherein processing the received trace data includes processing the received trace data to render the trace image according to at least one of a first rule to render images or a second rule to delete redundant trace data.

19. The method of claim 17, further comprising, before determining the rendering density of the trace image:

obtaining from the received trace data latitude and longitude coordinates of the display area; and comparing the latitude and longitude coordinates with screen coordinates of the display area in a screen of the terminal device to obtain the scaling value of the trace image.

20. The method of claim 17, further comprising, under the dot pattern rendering mode:

obtaining a superposition value of a pixel rendered according to a pixel superposition strategy; and rendering the pixel according to the pixel superposition strategy if the superposition value of the pixel is less than a preset superposition limit.

21. The method of claim 17, further comprising, under the line pattern rendering mode:

obtaining a distance value between two pixels in the rendered trace image; and rendering a line between the two pixels if the distance between the two pixels exceeds a second threshold.

22. The method of claim 17, further comprising, before transmitting the data request to the server:

obtaining coordinates of a display area in a screen coordinate system; and transforming the coordinates of the display area from the screen coordinate system to a latitude-longitude coordinate system and wherein the data request includes the coordinates in the latitude-longitude coordinate system.

23. The method of claim 22, further comprising, before transmitting the data request to the server further includes:

generating a visualization layer; and scaling the visualization layer according to a screen size to determine a display area.

24. The method of claim 23, wherein the data request to the server includes information related to a preset interval, the information enables the server to determine the trace data based on coordinates of the display area in a latitude-longitude coordinate system and the preset interval, and the trace data includes dynamic motion data of a target object within the display area within the preset interval.

* * * * *

UNITED STATES PATENT AND TRADEMARK OFFICE
CERTIFICATE OF CORRECTION

PATENT NO. : 10,192,289 B2
APPLICATION NO. : 15/729611
DATED : January 29, 2019
INVENTOR(S) : Ningyi Zhou et al.

Page 1 of 1

It is certified that error appears in the above-identified patent and that said Letters Patent is hereby corrected as shown below:

On the Title Page

Item (30), in the Foreign Application Priority Data:
"Jun. 3, 2015 (CN).............. 2015 1 0300977"
Should read:
--Jun. 3, 2015 (CN)............. 201510300977.X--

Signed and Sealed this
Sixteenth Day of April, 2019

Andrei Iancu
*Director of the United States Patent and Trademark Office*